United States Patent [19]

Dodge

[11] 4,240,730
[45] Dec. 23, 1980

[54] UNIQUE GEAR DRIVE MECHANISM FOR CAMERA-PROCESSOR

[75] Inventor: Dennis Dodge, Amherst, N.H.

[73] Assignee: Itek Corporation, Lexington, Mass.

[21] Appl. No.: 83,428

[22] Filed: Oct. 10, 1979

[51] Int. Cl.³ .............................................. G03B 17/50
[52] U.S. Cl. ...................................................... 354/90
[58] Field of Search ..................................... 355/27–29; 354/83, 84, 89, 90

[56] References Cited

U.S. PATENT DOCUMENTS

| | | | |
|---|---|---|---|
| 1,818,462 | 8/1931 | Caps | 355/29 |
| 2,751,814 | 6/1956 | Limberger | 355/28 |
| 4,011,570 | 3/1977 | Stiévenart et al. | 354/89 |

Primary Examiner—Donald A. Griffin
Attorney, Agent, or Firm—Homer O. Blair; Robert L. Nathans; Gerald H. Glanzman

[57] ABSTRACT

A unique gear drive control means is provided for causing the execution of various operations in the camera processor, such as driving the light sensitive medium to the exposure station, cutting the medium, driving the medium through a second transport means, and driving the medium again through the second transport means, along with a receptor sheet, which sheets are thereafter introduced into the entrance portion of a diffusion transfer processor. A single motor turns both the rocker itself and three gears mounted thereon, which gears sequentially actuate various drive gears of the processor to carry out the various film manipulation steps.

8 Claims, 3 Drawing Figures

4,240,730

UNIQUE GEAR DRIVE MECHANISM FOR CAMERA-PROCESSOR

BACKGROUND ART

A diffusion transfer type camera processor is the subject of a co-pending patent application Ser. No. 086,929 filed Oct. 22, 1979 by Dennis Dodge, Paul Matrvey, Thomas Matigan, and Robert Powers and assigned to the same assignee as the present invention.

As described below, a number of steps are performed on light sensitive material as the material passes through the camera-processor. It is the object of the present invention to provide an improved gear drive arrangement which carries out these steps, and which is driven by only a single motor, thereby to save manufacturing costs. The gear arrangement actuates means for feeding roll material to an exposure station, cutting the material to produce a sheet of pre-determined size, driving the exposed cut sheet through a second transport means, rewinding a film transport belt, and driving the cut sheet back through the second transport means along with a receptor sheet, wherein both sheets are introduced into the entrance portion of a diffusion transfer processor.

SUMMARY OF THE PREFERRED EMBODIMENT OF THE INVENTION

In accordance with the invention, the above mentioned single motor is coupled to a central gear rotatably mounted upon a pivotable rocker which also bears a first and second outer gear rotatably mounted thereon and in mesh with the central gear. The rocker is sequentially rotated by the single motor shaft to cause it to assume various positions to enable the outer rocker gears to co-act with cassette film drive means, knife actuation drive means, and film transport drive means, to execute the required steps for manipulating the film as it passes through the camera-processor. A rocker latch disk assumes first and second position to block or unblock the path of motion of the first outer rocker gear as described in greater detail below.

DETAILED DESCRIPTION

Figure 1:
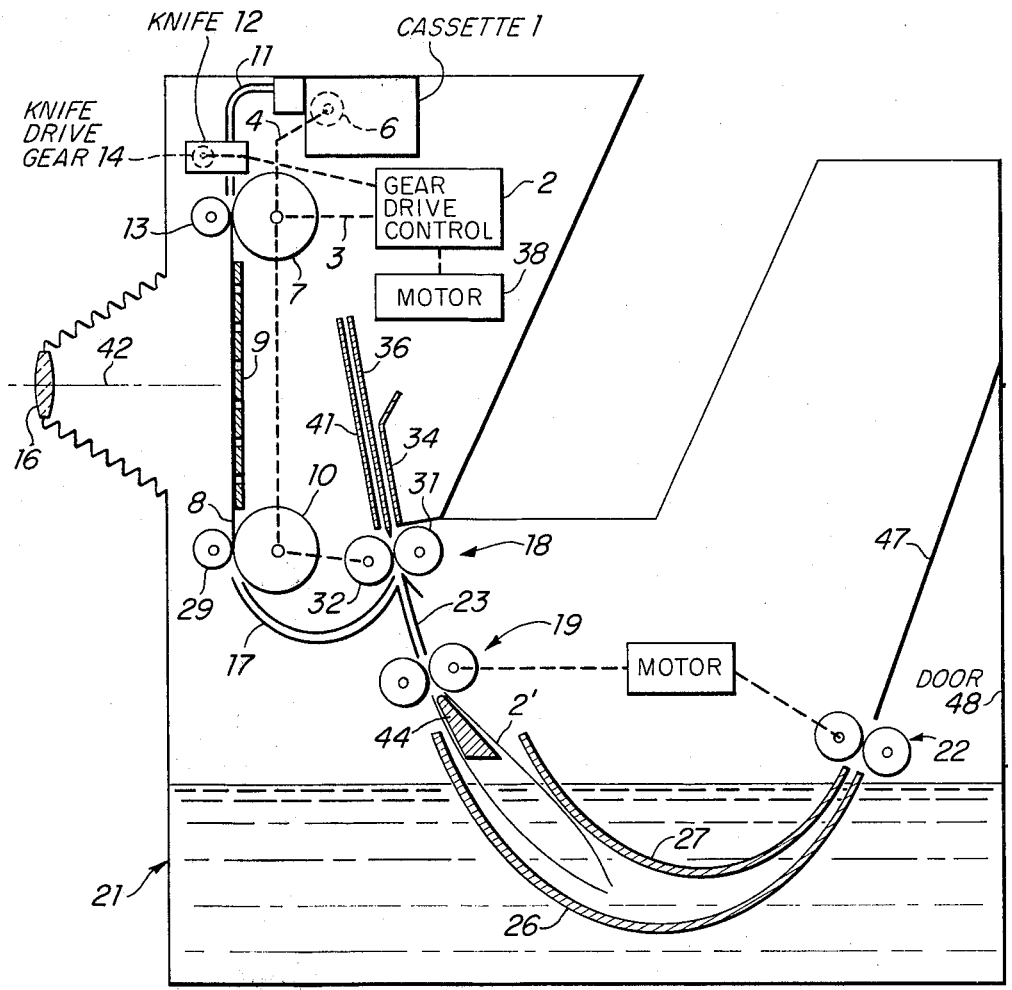
FIG. 1 illustrates the camera-processor.

FIG. 1 illustrates a negative film storage cassette 1 which is driven by gear drive control means 2 via mechanical linkages 3 and 4. Drive control means 2 causes cassette gear 6 and first transport roller 7 to rotate counter clockwise, which in turn causes belt 8 to be fed from roller 7 downwardly over vacuum platen 9. The film passes through cassette guide means 11 and knife station 12 into the nip between roller 7 and roller 13. This action continues until the leading edge of the film is positioned at a pre-determined portion of the platen. Drive control 2 thereafter actuates knife drive gear 14 to cause the light sensitive material to be cut to a predetermined length. Lens 16 thereafter projects an image upon the light sensitive material to expose it. The material could, of course, be cut before or after exposure of the light sensitive material. First guide means 17 facilitates the transportation of the sheet material through the second sheet transport means 18 until the trailing edge of the sheet is adjacent the upper entrance portion of the second transport means. The relatively flimsy receptor sheet is also introduced into the entrance portion of the second sheet transport means. A third sheet transport means 19 is used to drive the film into processor 21 and a fourth sheet transport means 22 is used to press the light sensitive sheet and the receptor sheet together to transfer the image and cause the sheet to be driven out of the bath of processor 21. A second sheet guide means 23 is employed to forward the two sheets to the third transport means 19. A third lower guide means 26 and a fourth upper guide means 27 is positioned within the bath to guide the sheets through processor 21.

After the light sensitive sheet is exposed, drive control means 2 again causes roller 7 and roller 6 to rotate counter clockwise, which causes the film to pass through the nip of rollers 6 and 29, through the first guide means 17 and through the nip of roller 31 and 32 of the second transport means 18. Before this occurs, the generally flimsy receptor sheet is introduced between a fifth guide means 34 and a sixth guide means 36, so that the leading edge thereof is positioned at the nip of rollers 31 and 32 of the second sheet transport means 18. Rollers 7, 6, and 32 are mechanically ganged together. As is well understood by those skilled in the art, such ganging may be performed by employing a chain and sprocket, or belt and pully arrangement. Drive control means 2 is driven by motor 38 and the gear drive control means 2 actuates the transport means in either one direction or the other, depending upon the machine requirements set forth below.

After exposure, rollers 6, 7 and 32 are rotated counter clockwise to cause the sheet to pass through first guide means 17, through the nip of rollers 31, and 32, and up within the chamber formed between the sixth guide means 36 and the seventh guide means 41. The trailing edge of the light sensitive sheet is now positioned at the entrance portion or nip of rollers 31 and 32. Although the receptor sheet is preferably inserted prior to the above described motion of the light sensitive sheet, the counterclockwise rotation of roller 32 will not adversely affect the positioning of the leading edge of the receptor sheet, and when the rotation of roller 32 ceases, the trailing edge of the light sensitive sheet is positioned at the nip of rollers 31 and 32, along with the leading edge of the receptor sheet.

Second transport means 18 is now driven so that roller 32 turns clockwise and both sheets pass through the second guide means 23, through the nip of the rollers comprising the third transport means 19 and into the bath as illustrated. A simple wedge 44 causes the initial separation of the sheets as they enter the bath of processor 21. The generally flimsy receptor sheet 2 tends to float upwardly as illustrated so that the sheet is guided by the upper guide means 27 while the generally stiffer negative material does not float, so that good separation is maintained. The leading edges of the sheets thereafter pass through the nip of the rollers comprising the fourth sheet transport means 22 and the image is transferred to the receptor sheet, and the sheets are thereafter deposited upon surface 47. The door 48 of the machine is thereafter opened and the material is removed.

The above mentioned gear drive control means 2 will now be described in greater detail.

First Rocker Position

Figure 2:
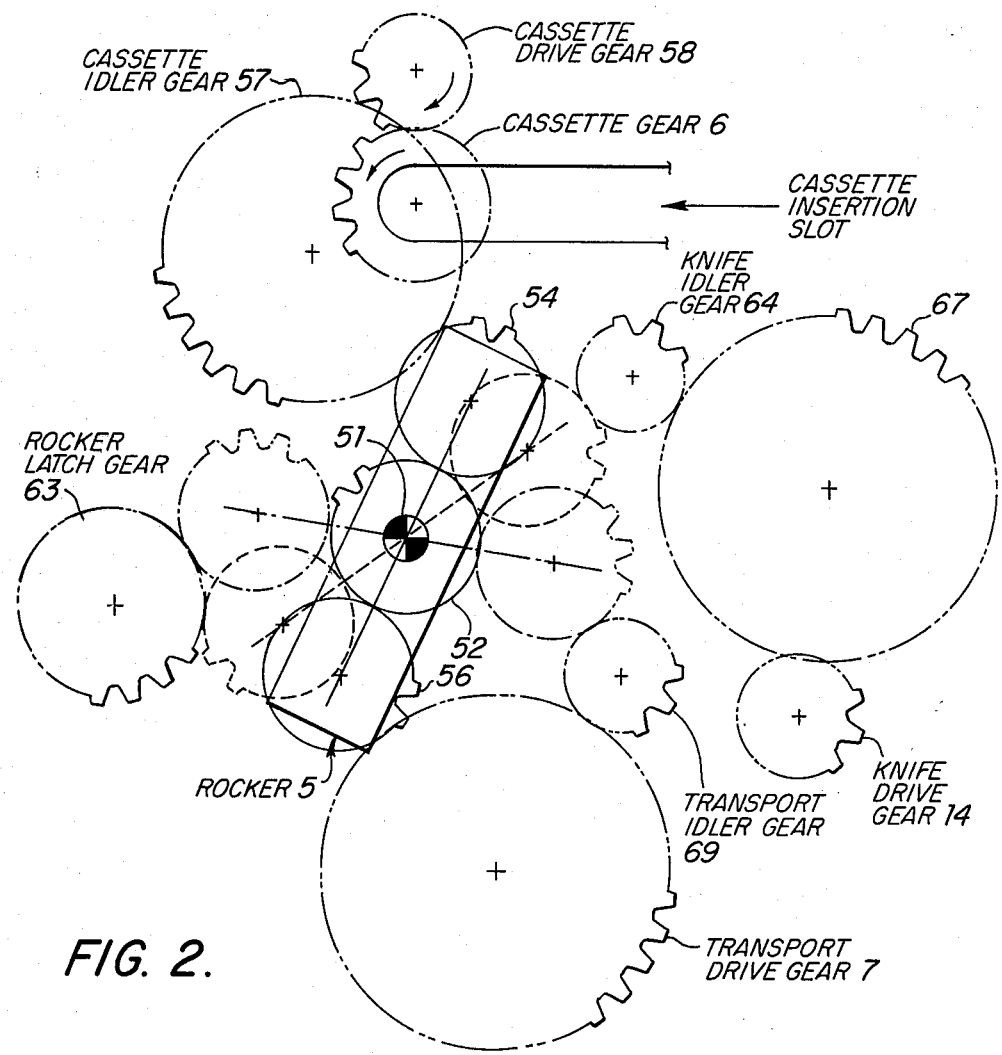
FIG. 2 illustrates details of the gear drive control means.

In FIG. 2, rocker 5, which comprises an elongated member 5, is illustrated having a first centrally mounted gear 52, a first outer gear 56, and a second outer gear 54 rotatably mounted thereon. Shaft 51 of motor 38 drives the centrally mounted gear, 52, and at the same time tends to rotate rocker 5 in whatever direction shaft 51 is rotating. Such action may be produced due to a high degree of frictional coupling between shaft 51 and the journal of gear 52. The counter clockwise rotation of shaft 51 causes central gear 52 to rotate counter clockwise, gear 56 to rotate clockwise, and first transport drive gear 7 to rotate counter clockwise. The counter clockwise rotation of shaft 51 simultaneously causes gear 54 to rotate clockwise, cassette idler gear 57 to rotate counter clockwise, cassette drive gear 58 to rotate clockwise, and cassette gear 6 to rotate counter clockwise, thereby to drive the film from cassette 1. The driving of transport drive gear 7 counter clockwise at this time causes the film to be fed a predetermined distance by the actuation of belt 8 as previously described.

Second Rocker Position

After the exposure of the film to the image projected thereon by lens 16, it is necessary to actuate knife drive gear 14. Before this occurs, rocker latch disk 63 moves toward the viewer of FIG. 2 to engage the first outer gear 56, after a degree of clockwise rotation of rocker 5. Such action is made apparent by the inspection of FIG. 3, wherein solenoid 65 is de-energized so that spring 71 causes rocker latch disk 63 to move into the engage position toward the viewer of FIG. 2, as indicated by the dashed outline in FIG. 3. The actuation of knife gear 14 is performed by actuating motor 38 to drive motor shaft 51, and hence gear 52 clockwise. Such action causes rocker 5 to turn clockwise until the first outer gear 56 engages rocker latch disk 63 as indicated in FIG. 2 by the dashed configuration of the gears. This action prevents further clockwise rotation of rocker 5. Clockwise rotation of shaft 51 causes counter clockwise rotation of the second outer gear 54 to in turn rotate drive knife idler gear 64 in a clockwise direction. Such action produces a clockwise rotation of knife drive gear 14 since it is coupled to knife idler gear 64 via gear 67, and the actuation of knife drive gear 14 causes the sheet to be cut.

Third Rocker Position

As described above, the first transport means now is to be driven so as to feed the cut sheet through the bite of rollers 6 and 29, through guide means 17, and upwardly through the second transport means 18. This step is accomplished by energizing solenoid 65 to cause rocker latch disk 63 to move inwardly from the viewer of FIG. 2, so that clockwise rotation of rocker 5 enables gears 52, 56, and 54 to assume the position illustrated by the dot-dash lines. In other words, motor shaft 51 now rotates clockwise and hence, rocker 5 is permitted to rotate clockwise so that second outer gear 54 engages transport idler 69, which in turn is coupled to first transport drive gear 7. More specifically, clockwise rotation of motor shaft 51 produces clockwise rotation of central gear 52, counter clockwise rotation of the second outer gear 54, clockwise rotation of transport idler gear 69, and hence, counter clockwise rotation of gear 7, which in turn causes belt 8 to drive the sheet off of the exposure platen 9 and through the second transport means 18. Second transport roller 32 and roller 6 are also rotated counter clockwise at this time by the rotation of transport gear 7, due to the above mentioned coupling indicated by the dashed lines between members 7, 6 and 32. It should be noted that first outer gear 56 does not engage cassette idler gear 57 (to inappropriately feed film at this time) since further clockwise rotation of rocker 5 is prevented by the blocking action of transport idler 69.

It is now desirable to rotate first transport gear 7 clockwise so as to rewind belt 8 to set the stage for the feeding of further sheet material to be exposed. Motor shaft 51 is now driven counter clockwise while outer gears 54 and 56 are in the position illustrated by the dot-dash lines in FIG. 2. The rocker is maintained in this position by the blocking action of rocker latch gear 63 owing to the de-energization of solenoid 65. The counter clockwise rotation of motor shaft 51 produces counter clockwise rotation of gear 52, clockwise rotation of gear 54, counter clockwise rotation of transport idler gear 69, and clockwise rotation of first transport drive gear 7 so as to re-wind belt 8. Roller 32 is now driven clockwise to drive the film and receptor sheet downwardly toward the processor as previously described.

Return to First Rocker Position

Figure 3:
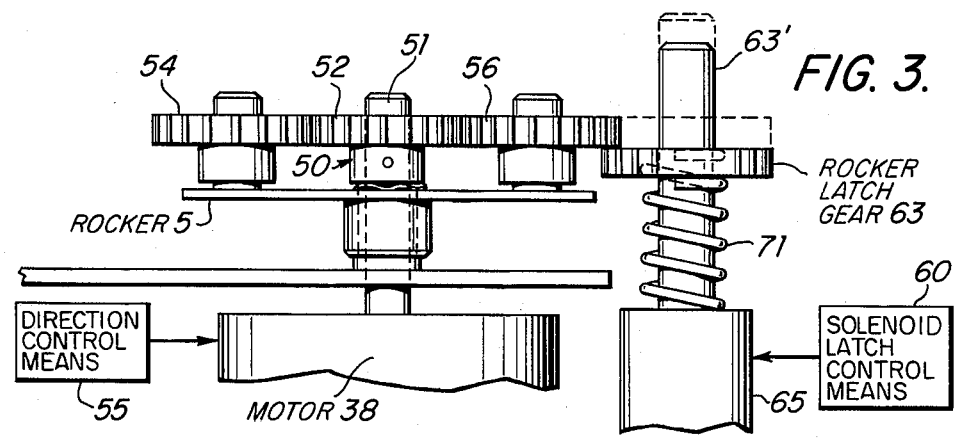
FIG. 3 illustrates the operation of the rocker latch.

The rocker latch disk is now pulled in a direction away from the viewer of FIG. 2 and into the disengage position illustrated in FIG. 3 (solid outline) owing to the energization of solenoid 65. Motor shaft 51 is now driven in a counter clockwise direction to move rocker 5 in the counter clockwise direction to permit the rocker to again assume the home position illustrated in the solid lines in FIG. 2. The entire cycle described herein above is thereafter repeated to feed sheet material from cassette 1 over exposure platen 9.

In the event that pre-cut sheets are employed, and thus, the use of a knife is not required, a simpler version of the present invention may be employed. The intermediate rocker position represented by the dashed lines may be ignored. The operation of the first position of the rocker is the same as described above. Rocker latch 63 assumes the non-blocking position and clockwise rotation of shaft 51 causes rocker 5 to assume the other extreme position represented by the dot-dashed lines, and transport drive gear 7 is rotated counter clockwise to drive the sheet off of the exposure station as explained above. Rocker latch 63 now assumes the blocking position, and shaft 51 is rotated counter clockwise to cause the transport drive gear to rewind the belt. It should be noted that rocker 5 cannot rotate back to the first position due to the blocking action of rocker latch 63. After this occurs, the rocker latch moves to the disengaged or non-blocking position, and counter clockwise rotation of shaft 51 causes rocker 5 to reassume the first position, and the cycle is repeated.

In both modes of operation described above, it should be noted that the presence of transport idler gear 69 prevents further clockwise rotation of rocker 5 from the dot-dashed position, so that first outer gear 56 cannot contact cassette idler gear 57 to drive the film.

Originally, the rocker latch 63 took the form of a gear which meshed with gear 56. However, it has been determined that a round disk rather than a gear is preferably since the disk reduces the friction encountered when pulling one gear out of mesh with the other gear. Gears, however, are intended to be within the scope of the invention, although they require a greater pulling force for disengagement with gear 56.

It should be understood that other components and configurations may be substituted for those described in order to practice the invention, and the invention is to be limited only by the permissable scope of the following claims. References are made in the claims to numbered components in the described embodiment, and it should be understood that the claims are not to be restricted to such embodiments, as the numbers employed in the claims are merely exemplary of the nature of the claimed means.

I claim:

1. In a camera-processor having a film transport drive gear means (7, 69), a film drive gear means (57, 58, 6), a knife drive gear means (64, 67, 14), an exposure station (8, 9), an improved gear drive control means comprising:
   a. a rocker (5) having a centrally mounted gear (52) thereon and first and second outer gears (56, 54) mounted thereon and positioned to be in engagement with said centrally mounted gear;
   b. motor means 38 having a shaft (51) for rotating said centrally mounted gear via shaft coupling means (50) which also tends to cause rotation of said rocker in the same direction as the direction of rotation of said shaft;
   c. motor control means (55) for rotating said shaft in a first direction to cause said first outer gear to drive said transport drive gear means and simultaneously cause said second outer gear to drive said film cassette drive gear means when said rocker member assumes a first position, thereby to drive said film from said cassette and to actuate said transport drive gear means;
   d. a rocker latch device (63, 65, 71), which unblocks the path of motion of said first outer gear when said rocker latch device assumes a first non-engaging position which blocks the path of motion of said first outer gear when said rocker latch device assumes a second engaging position;
   e. rocker latch control means (60) for causing said rocker latch device to selectively assume said first or second position;
   f. means for causing said shaft to turn in a second direction opposite said first direction and to cause said rocker latch device to assume said second rocker latch position, thereby to arrest said rocker member in said second position for causing said second outer rocker gear to drive said knife drive gear means for causing the film sheet to be cut;
   g. means for causing said rocker latch device to again assume said first non-engaging position to thereby enable said rocker member to assume a third position;
   h. means for causing said motor shaft to turn in said second direction for causing said second outer gear to engage said film transport gear means in a third rocker position thereby to cause said cut sheet to be driven off of said exposure platen;
   i. means for causing said motor shaft to turn in said first direction while said rocker device is maintained in said third position by said rocker latch device for causing said transport gear means to reverse direction to rewind said belt;
   j. means for rotating said motor shaft in said first direction to rotate said rocker from said third position in said first direction to said first position while said rocker latch device again assumes said first non-engaging latch position.

2. The combination as set forth in claim 1 wherein said rocker latch device comprises a latch disk (63) for engaging said first outer gear, a latch gear support means (51), and said rocker latch control means includes a means for translating said disk along its longitudinal axis (65) thereby to shift the position of said disk between a first or second position.

3. The combination as set forth in claim 2 further including a solenoid (65) for translating said disk along said longtitudinal axis.

4. The combination as set forth in claims 1, 2 or 3 wherein said transport drive gear means further comprises a transport drive gear (7) and a transport idler gear (69) both of which are positioned so that said first outer rocker mounted gear directly engages said transport drive gear in said first rocker position and said second outer rocker mounted gear contacts said transport idler gear when said rocker assumes said third position.

5. In a camera-processor having a film transport drive gear means (7, 69), a film drive gear means (57, 58, 6), and an improved gear drive control means comprising:
   a. a rocker (5) having a centrally mounted gear (52) thereon and first and second outer gears (56, 54) mounted thereon and positioned to be in engagement with said centrally mounted gear;
   b. motor means 38 having a shaft (51) for rotating said centrally mounted gear via shaft coupling means (50) which also tends to cause rotation of said rocker in the same direction as the direction of rotation of said shaft;
   c. motor control means (55) for rotating said shaft in a first direction to cause said first outer gear to drive said transport drive gear means and simultaneously cause said second outer gear to drive said film cassette drive gear means when said rocker member assumes a first position thereby to drive said film from said cassette and to actuate said transport drive gear means;
   d. a rocker latch device (63, 65, 71), which unblocks the path of motion of said first outer gear when said rocker latch device assumes a first non-engaging position which blocks the path of motion of said first outer gear when said rocker latch device assumes a second engaging position;
   e. rocker latch control means (60) for causing said rocker latch device to selectively assume said first or second position;
   f. means for causing said rocker latch device to assume said first non-engaging position for enabling said rocker member to assume another position;
   g. means for causing said motor shaft to turn in a second direction opposite said first direction for causing said second outer gear to engage said film transport gear means in a said other rocker position thereby to cause said film to be driven off of said exposure platen;
   h. means for causing said motor shaft to turn in said first direction while said rocker device is maintained in said other position by said rocker latch device for causing said transport gear means to reverse direction to rewind said belt; and,
   i. means for rotating said motor shaft in said first direction to rotate said rocker from said other position to said first position while said rocker latch device again assumes said first non-engaging latch position.

6. The combination as set forth in claim 5 wherein said rocker latch device comprises a latch disk (63) for engaging said first outer gear (65), a latch disk support means (51), and said rocker latch control means includes means for translating said disk along its longtitudinal axis (65) thereby to shift the position of said disk between a first or second position.

7. The combination as set forth in claim 6 further including a solenoid (65) for translating said disc along said longtitudinal axis.

8. The combination as set forth in claims 5, 6, or 7 wherein said transport drive gear means further comprises a transport drive gear (7) and a transport idler gear (69), both of which are positioned so that said first outer rocker disk mounted gear directly engages said transport drive gear in said first rocker position and said second outer rocker mounted gear contacts said transport idler gear when said rocker assumes said second position.

* * * * *